L. H. LITTLE.

Coffee Pot.

No. 46,917.

Patented March 21, 1865.

Witnesses
Wm Brewn
C. L. Tipliff

Inventor
L. H. Little
per Munn & Co
Attorneys

UNITED STATES PATENT OFFICE.

LEWIS H. LITTLE, OF COPAKE, NEW YORK.

COFFEE-POT.

Specification forming part of Letters Patent No. 46,917, dated March 21, 1865.

*To all whom it may concern:*

Be it known that I, LEWIS H. LITTLE, of Capake, in the county of Columbia and State of New York, have invented a new and useful Improvement in Coffee-Pots; and I do hereby declare that the following is a full, clear, and exact description thereof, which will enable others skilled in the art to make and use the same, reference being had to the accompanying drawings, forming a part of this specification, in which—

Figure 1:
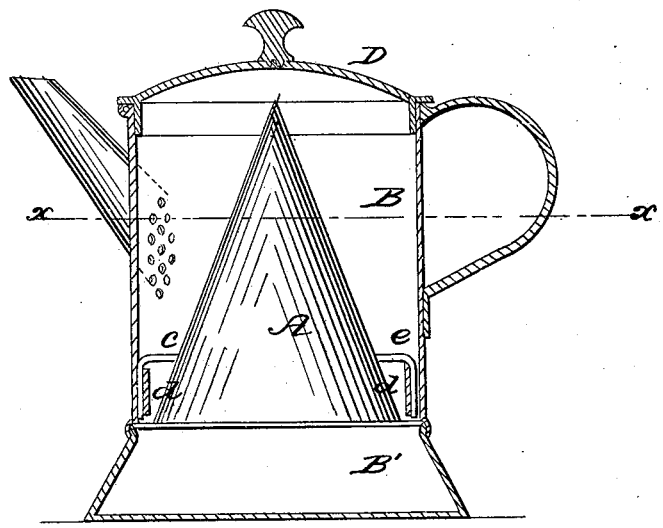
Figure 2:
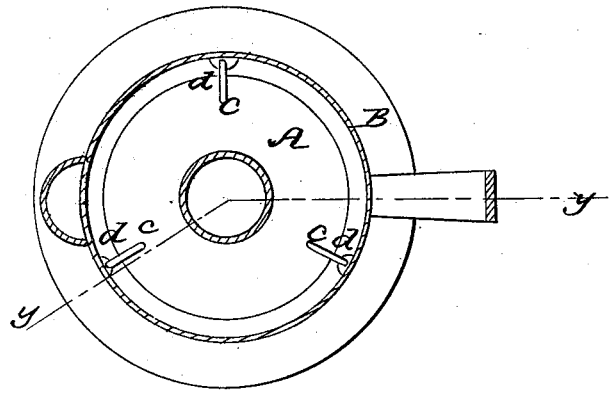

Figure 1 is an elevation of a vertical section of a coffee-pot made according to my invention, the section being made along the bent line $y$ of Fig. 2. Fig. 2 is a plan of a horizontal section taken on the line $x$ of Fig. 1.

Similar letters of reference indicate like parts.

This invention consists in placing a body of conical form centrally within a coffee-pot, so as to leave an annular space between the base of the cone and the inner sides of the pot. The object is to "settle" the coffee, or prevent the sediment from rising in the upper part of the vessel.

B represents a coffee-pot of cylindrical form, its lower part being enlarged by inclining its sides outwardly as they approach the base, so as to make in the lowest division of the coffee-pot a chamber, B', of larger diameter than the parts above. The vessel is made with a handle and spout, as usual, and with a strainer between the spout and the interior of the coffee-pot.

A is a body of conical shape, made of tin or other metal which will neither impart a disagreeable odor to the coffee or other contents of the coffee-pot, nor otherwise affect them injuriously. It is closed on all sides, so as not to admit anything within it. Its diameter at the base is a little less than the inner diameter of the vessel within which it is to be placed, and its height is to be such as when fixed in the pot to permit the cover D to be put on without touching the apex of the cone.

Hooks $c$ (here shown to be three in number) extend from the sides of the cone A just above its base, and are received into vertical sockets $d$, which are made on the inner sides of the coffee-pot just above the lower chamber, B'.

The sockets are so placed and the hooks so adjusted that the cone will be held upright and centrally within the pot, and so that its base shall be on a line with the upper edge of the chamber B'.

The effect of this arrangement will be to prevent any sediment and grounds present in the vessel from rising therein when the vessel is moved. This result is especially desirable in such coffee-pots as are used both to boil or steep the grounds therein and to pour or draw out from to fill the cups from which the beverage is taken. In such cases, after the beverage is fully prepared and has had time to settle, any agitation of the liquid is apt to disturb the sediment and grounds, and thereby make the beverage thick from the rising of the fine grounds toward the top of the liquid. My improvement is designed to prevent this result. The grounds will be contained in the chamber or division B', and when the vessel is moved any currents created thereby in the liquid will strike the base of the cone A and be deflected downward, carrying the sediments and grounds floating in the currents back again to the bottom of the chamber. The annular space around the base of the cone is narrow, and presents no facilities for the passage of the grounds upward through it when the liquid is agitated by moving the vessel. When the coffee is being made or being boiled, the upward currents which occur in the liquid will grow sluggis has they rise, because the space in the vessel increases as the apex of the cone is approached. The return currents will carry the floating grounds and sediment along the sloping sides of the cone, and when they pass below its base the largest portion will be retained below the cone, whose base will continually deflect them downward during the process of boiling.

Having thus described my invention, I claim as new and desire to secure by Letters Patent—

Placing a cone within a coffee-pot, for the purpose and in the manner substantially as above described.

LEWIS H. LITTLE.

Witnesses:
 HOMER BRIGGS,
 FRANK WILCOX.